US008842226B2

(12) United States Patent
Kendall et al.

(10) Patent No.: US 8,842,226 B2
(45) Date of Patent: Sep. 23, 2014

(54) METHOD AND APPARATUS FOR ENABLING CHANNEL SELECTION

(75) Inventors: Scott Allan Kendall, Lexington, KY (US); Carolynn Rae Johnson, Allison Park, PA (US); Valerie Sacrez Liebhold, Ashland, MA (US)

(73) Assignee: Thomson Licensing, Boulogne-Billancourt (FR)

( * ) Notice: Subject to any disclaimer, the term of this patent is extended or adjusted under 35 U.S.C. 154(b) by 1097 days.

(21) Appl. No.: 11/992,358

(22) PCT Filed: Oct. 3, 2005

(86) PCT No.: PCT/US2005/035435
§ 371 (c)(1),
(2), (4) Date: Mar. 20, 2008

(87) PCT Pub. No.: WO2007/040531
PCT Pub. Date: Apr. 12, 2007

(65) Prior Publication Data
US 2010/0157166 A1    Jun. 24, 2010

(51) Int. Cl.
*H04N 5/44* (2011.01)
*G06F 3/0362* (2013.01)
*G06F 3/0338* (2013.01)
*H04N 5/50* (2006.01)

(52) U.S. Cl.
CPC ...... *H04N 5/4403* (2013.01); *H04N 2005/4416* (2013.01); *G06F 3/0362* (2013.01); *G06F 3/0338* (2013.01); *H04N 5/50* (2013.01)
USPC ........................................ 348/734

(58) Field of Classification Search
USPC ........................................ 348/734
See application file for complete search history.

(56) References Cited

U.S. PATENT DOCUMENTS

| | | | |
|---|---|---|---|
| 3,916,359 | A | 10/1975 | Goto et al. |
| 4,056,794 | A | 11/1977 | Ohigashi et al. |
| 5,422,682 | A | 6/1995 | Nakade et al. |
| 5,589,893 | A | 12/1996 | Gaughan et al. |

(Continued)

FOREIGN PATENT DOCUMENTS

| | | |
|---|---|---|
| JP | 07-038969 A | 2/1995 |
| JP | 7-107574 | 4/1995 |
| JP | 11-355675 A | 12/1999 |
| WO | 2005/018222 A1 | 2/2005 |

*Primary Examiner* — Nathan Flynn
*Assistant Examiner* — Alfonso Castro
(74) *Attorney, Agent, or Firm* — Robert D. Shedd; Reitseng Lin

(57) ABSTRACT

A method for enabling channel selection for an electronic apparatus such as a television signal receiver is performed via a user input device having a key capable of being rotated and pressed. According to an exemplary embodiment, the method includes enabling selection of a plurality of channel numbers to form a group, enabling a first one of the channel numbers to be selected as a initial channel number in response to the selection of the plurality of channel numbers in the group, enabling display of the initial channel number, enabling display of a second one of the channel numbers that is larger than the initial channel number if the key is rotated in a first direction, enabling display of a third one of the channel numbers that is smaller than the initial channel number if the key is rotated in a second direction, and tuning to one of the initial channel number, the second channel number and the third channel number responsive to depression of the key.

10 Claims, 7 Drawing Sheets

(56) References Cited

U.S. PATENT DOCUMENTS

| | | |
|---|---|---|
| 6,094,237 A | 7/2000 | Hashimoto |
| 6,281,940 B1 * | 8/2001 | Sciammarella ............... 348/564 |
| 6,526,577 B1 * | 2/2003 | Knudson et al. ................ 725/40 |
| 6,597,374 B1 | 7/2003 | Baker et al. |
| 8,001,563 B2 * | 8/2011 | Knudson et al. ................ 725/38 |
| 8,531,392 B2 * | 9/2013 | Branton et al. ................ 345/156 |
| 2002/0075408 A1 * | 6/2002 | Curreri .......................... 348/569 |
| 2006/0017857 A1 * | 1/2006 | Sata et al. ...................... 348/734 |
| 2006/0184967 A1 * | 8/2006 | Maynard et al. ................ 725/46 |
| 2007/0009229 A1 * | 1/2007 | Liu ................................. 386/83 |
| 2007/0273649 A1 | 11/2007 | Matsui et al. |

* cited by examiner

METHOD AND APPARATUS FOR ENABLING CHANNEL SELECTION

BACKGROUND OF THE INVENTION

1. Field of the Invention

This application is a National Stage Application and claims the benefit, under 35 U.S.C. §365 of International Application PCT/US2005/035435 filed Oct. 3, 2005, which was published in accordance with PCT Article 21(2) on Apr. 12, 2007 in English.

2. Background Information

Electronic apparatuses such as television signal receivers are often controllable by user input devices such as hand-held, wireless remote control devices and/or other user input devices. Current designs for such user input devices often include a relatively large number of keys/buttons to accommodate the many functions capable of being provided by the apparatus. Such designs may, for example, include specific keys/buttons that are dedicated to controlling certain apparatus functions, and a numeric key pad to facilitate channel selection.

With the aforementioned type of user input device designs, it may be unduly difficult and/or inconvenient for users to select channels. For example, users may have difficulty viewing specific numeric keys on the key pad in dark environments. As a result, users may have to inconveniently leave their seat and turn on a light before selecting a channel. Moreover, even in well-lit environments, channel selection using a numeric key pad may be difficult if the individual numeric keys are positioned relatively close together on the key pad. Channel selection using a numeric key pad is further deficient in that it requires users to remember and enter the exact channel numbers they desire, and thereby increases their cognitive workload.

Accordingly, there is a need for a method for enabling users to select channels for an electronic apparatus such as a television signal receiver that addresses the foregoing problem, and thereby enables users to select channels in an easier and more convenient manner. The present invention addresses these and/or other issues.

SUMMARY OF THE INVENTION

In accordance with an aspect of the present invention, a method for enabling channel selection via a user input device having a key capable of being rotated and pressed is disclosed. According to an exemplary embodiment, the method comprises enabling selection of a plurality of channel numbers to form a group; enabling selection of a first one of said channel numbers as an initial channel number in response to said selection of said channel numbers in the group; enabling display of said initial channel number; enabling display of a second one of said channel numbers that is larger than said initial channel number if said key is rotated in a first direction; enabling display of a third one of said channel numbers that is smaller than said initial channel number if said key is rotated in a second direction; and tuning to one of said initial channel number, said second channel number and said third channel number responsive to depression of said key.

In accordance with another aspect of the present invention, an electronic apparatus for enabling channel selection via a user input device having a key capable of being rotated and pressed is disclosed. According to an exemplary embodiment, the electronic apparatus comprises processing means (24) for enabling selection of a plurality of channel numbers to form a group and memory means coupled to the processing means for storing the channel numbers in the group. Processing means enables selection of a first one of said channel numbers as an initial channel number in response to said selection of channel numbers in the group, and enables display of the initial channel number. The processing means enables display of a second one of the channel numbers that is larger than the initial channel number if the key is rotated in a first direction, and enables display of a third one of the channel numbers that is smaller than the initial channel number if the key is rotated in a second direction. The electronic apparatus tunes to one of the initial channel number, the second channel number and the third channel number responsive to depression of the key.

In accordance with yet another aspect of the present invention, a television signal receiver for enabling channel selection via a user input device having a key capable of being rotated and pressed is disclosed. According to an exemplary embodiment, the television signal receiver comprises processing means (24) for enabling selection of a plurality of channel numbers to form a group and memory means coupled to the processing means for storing the channel numbers in the group. Processing means enables selection of a first one of said channel numbers as an initial channel number in response to said selection of channel numbers in the group, and enables display of the initial channel number. The processing means enables display of a second one of the channel numbers that is larger than the initial channel number if the key is rotated in a first direction, and enables display of a third one of the channel numbers that is smaller than the initial channel number if the key is rotated in a second direction. The electronic apparatus tunes to one of the initial channel number, the second channel number and the third channel number responsive to depression of the key.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
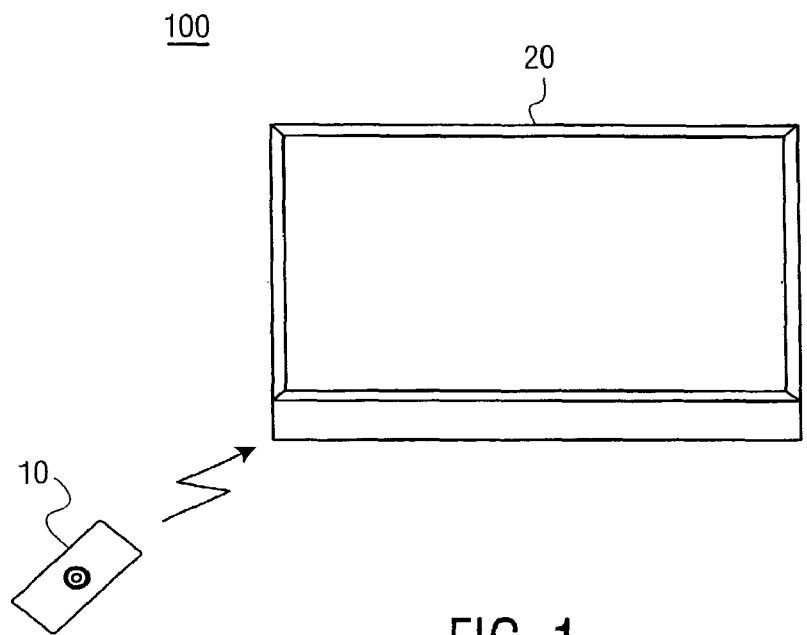
FIG. 1 is an exemplary environment suitable for implementing the present invention.

Referring now to the drawings, and more particularly to FIG. 1, an exemplary environment 100 suitable for implementing the present invention is shown. As indicated in FIG. 1, environment 100 comprises user input device 10, and an electronic apparatus 20. According to an exemplary embodiment, user input device 10 is embodied as a hand-held, wireless remote control device, but could also be embodied as a wired and/or wireless keyboard, integrated control panel of electronic apparatus 20, and/or other user input device. Also according to an exemplary embodiment, electronic apparatus 20 is embodied as a television signal receiver having an integrated display device, but could also be embodied as another type of electronic apparatus or device including one that does not include an integrated display device (e.g., set-top box, radio, video cassette recorders (VCRs), digital versatile disk (DVD) players, video game boxes, personal video recorders (PVRs), etc.). Further exemplary details regarding user input device 10 and electronic apparatus 20 will be provided later herein.

Figure 2:
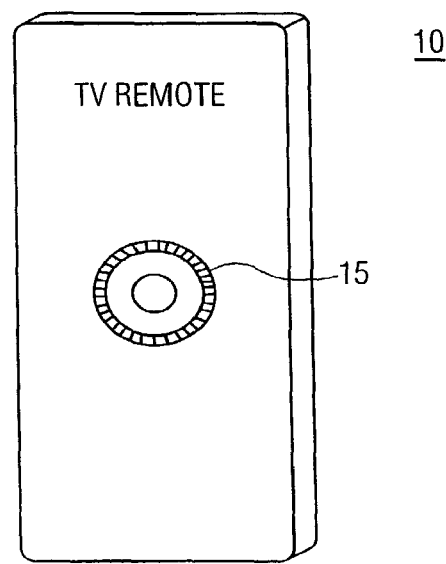
FIG. 2 is a diagram providing further details of the user input device of FIG. 1 according to an exemplary embodiment of the present invention.

Referring to FIG. 2, a diagram providing further details of user input device 10 of FIG. 1 according to an exemplary embodiment of the present invention is shown. User input device 10 of FIG. 2 comprises a control key 15 that may be manipulated by users to control functions including a channel selection function of electronic apparatus 20. User input device 10 may also include one or more other keys/buttons and/or other control mechanisms in addition to control key 15. According to an exemplary embodiment, user input device 10 is operative to generate and output control signals in a wired and/or wireless (e.g., via infrared or radio frequency (RF) link, etc.) manner responsive to user rotation and/or depression of control key 15 to thereby control functions including the channel selection function of electronic apparatus 20. Control key 15 may, for example, be embodied as a Coin Key™ produced by Telenostra, or a similar type of control mechanism.

Figure 3:
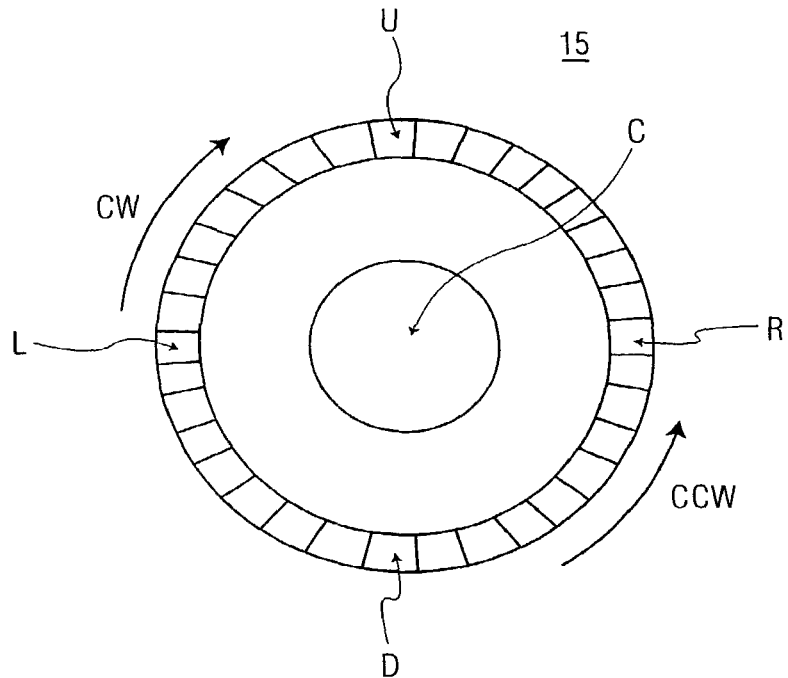
FIG. 3 is a diagram providing further details of the control key of FIG. 2 according to an exemplary embodiment of the present invention.

Referring to FIG. 3, a diagram providing further details of control key 15 of FIG. 2 according to an exemplary embodiment of the present invention is shown. As indicated in FIG. 3, control key 15 is capable of being rotated by users in a clockwise (CW) direction and a counter-clockwise (CCW) direction. Control key 15 may be indexed such that it rotates in individual increments in a user-friendly manner. Moreover, control key 15 is capable of being pressed by users in at least five directions, namely an upward (U) direction, a downward (D) direction, a right (R) direction, a left (L) direction, and a center (C) direction. As will be described later herein, control key 15 can be manipulated by users to facilitate functions including the channel selection function of electronic apparatus 20.

Figure 4:
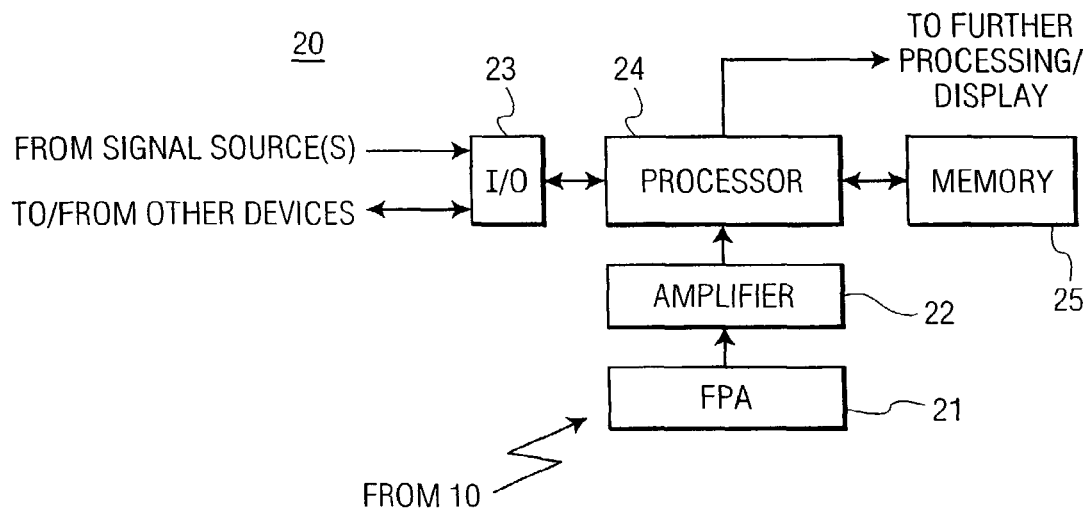
FIG. 4 is a diagram providing further details of the electronic apparatus of FIG. 1 according to an exemplary embodiment of the present invention.

Referring to FIG. 4, a diagram providing further details of electronic apparatus 20 of FIG. 1 according to an exemplary embodiment of the present invention is shown. Electronic apparatus 20 of FIG. 4 comprises front panel means such as front panel assembly (FPA) 21, amplifying means such as amplifier 22, and input/output (I/O) means such as I/O block 23, processing means such as processor 24, and memory means such as memory 25. Some of the foregoing elements of FIG. 4 may be embodied using ICs, and some elements may for example be included on one or more ICs. For clarity of description, certain conventional elements associated with electronic apparatus 20 such as certain control signals, power signals and/or other elements may not be shown in FIG. 4.

FPA 21 is operative to receive user inputs from user input device 10, and to output signals corresponding to the user inputs to amplifier 22. According to an exemplary embodiment, FPA 21 receives signals, such as IR and/or RF signals, from user input device 10 and generates corresponding signals which are output to amplifier 22. Amplifier 22 is operative to amplify the signals provided from FPA 21 for output to processor 24.

I/O block 23 is operative to perform I/O functions of electronic apparatus 20. According to an exemplary embodiment, I/O block 23 is operative to receive signals such as audio, video and/or data signals in analog and/or digital modulation format from one or more signal sources such as terrestrial, cable, satellite, internet and/or other signal sources. Accordingly, I/O block 23 may include a plurality of different I/O terminals. I/O block 23 is also operative to output processed signals to one or more other devices, and to receive signals from such devices.

Processor 24 is operative to perform various signal processing and control functions of electronic apparatus 20. According to an exemplary embodiment, processor 24 processes the audio, video and/or data signals provided from I/O block 23 by performing functions including tuning, demodulation, forward error correction, and transport processing functions to thereby generate digital data representing audio, video and/or data content. The digital data produced from such processing functions may be provided for further processing (e.g., MPEG decoding, etc.) and output.

Processor 24 is also operative to execute software code that enables users to control electronic apparatus 20 via control key 15 of user input device 10. According to an exemplary embodiment, processor 24 detects and processes user inputs provided via control key 15 of user input device 10 to facilitate a channel selection function of electronic apparatus 20. As will be described later herein, processor 24 also enables the selection of initial channel numbers which are used to facilitate rapid navigation of available channels. Processor 24 is also operative to perform and/or enable other functions of electronic apparatus 20 such as, but not limited to, enabling on-screen menu displays, reading and writing data from and to memory 25, and/or other functions.

Memory 25 is operative to perform data storage functions of electronic apparatus 20. According to an exemplary embodiment, memory 25 stores data including, but not limited to, software code, on-screen menu data, user setup data, and/or other data.

Figure 5:
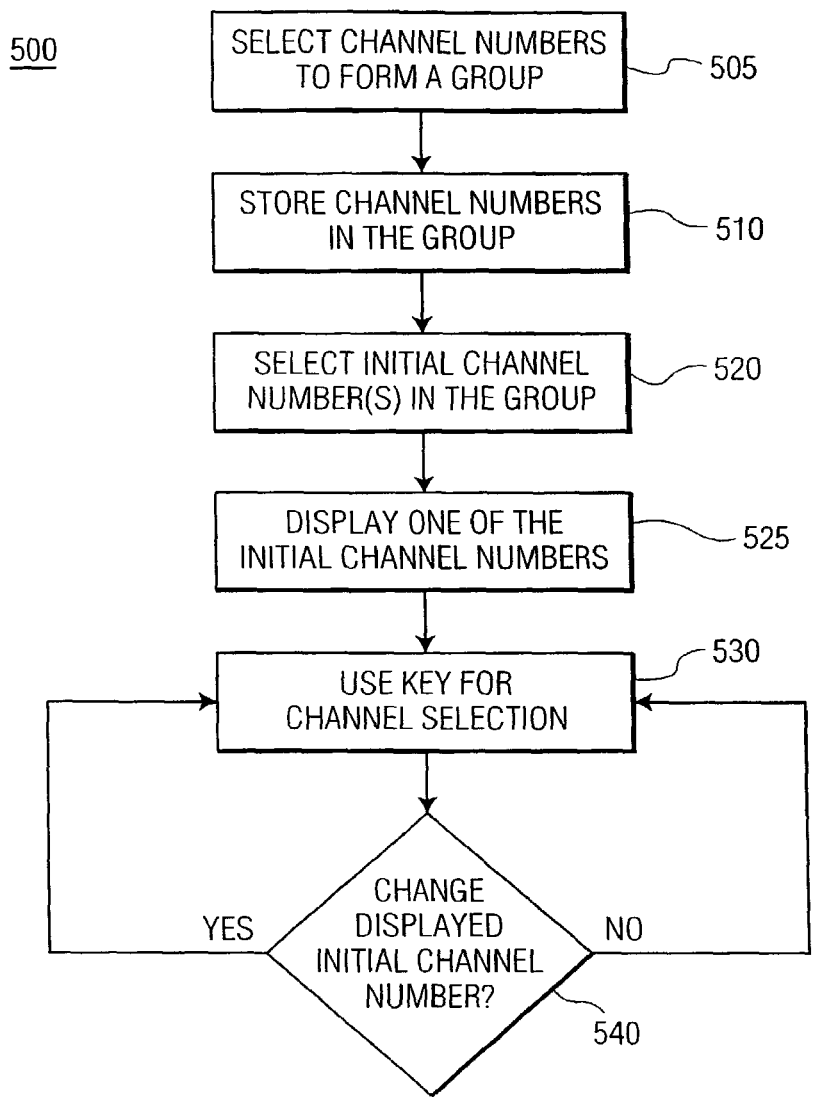
FIG. 5 is a flowchart illustrating steps for enabling channel selection according to an exemplary embodiment of the present invention.

Referring now to FIG. 5, a flowchart 500 illustrating steps for enabling channel selection according to an exemplary embodiment of the present invention is shown. For purposes of example and explanation, the steps of FIG. 5 will be described with reference to user input device 10 and electronic apparatus 20 as previously described herein. The steps of FIG. 5 are merely exemplary, and are not intended to limit the present invention in any manner.

At step 505, electronic apparatus 20 automatically selects a plurality of channel numbers to form a group or allows a user to manually select the plurality of channel numbers in a group. A user may be able to manually add or delete channels in a formed group. According to an exemplary embodiment, processor 24 uses its tuning function to scan a plurality of channels (i.e., frequencies) to form a group and thereby identify those channels exhibiting a predetermined level of signal strength. This channel scanning process may be separately performed for each of the different I/O terminals of I/O block 23. In another exemplary embodiment, the plurality of channel numbers is selected according to user preferences, such as preferred program category.

In an alternative, the processor 24 allows a user to select a subset of channels, such as favorite channels among the available channels, to form a different group.

At step 510, electronic apparatus 20 stores the plurality of channel numbers in a formed group in memory 25 at step 510. As noted above, the electronic apparatus 20 may allow selection of channels to form a different group, and store more than one group in the memory 25. If more then one group is stored, a user may select one of the groups for the channel to navigation. The channel numbers in a group stored at step 510 illustratively represent favorite channels or the tunable channels available to users for listening and/or viewing (i.e., the available channel lineup). Step 510 may for example be performed as part of a setup process for electronic apparatus 20.

At step 520, one or more initial channel numbers are selected from among the channel numbers in a group stored at step 510. According to an exemplary embodiment, a user may manually select the one or more initial channel numbers at step 520 responsive to an on-screen menu display, or they may be automatically selected by processor 24 in response to the selection of the plurality of channel numbers in the group. Step 520 may also be performed as part of the aforementioned setup process for electronic apparatus 20. As will be described later herein, the initial channel numbers allow users to quickly navigate through the entire available channel lineup via control key 15 of user input device 10 by skipping from one initial channel number to the next.

If the one or more initial channel numbers in a group are automatically selected by processor 24 at step 520, the number of such initial channel numbers selected depends on the total number of channel numbers in the group stored at step 510. For example, if a total of 18 channel numbers in the group are stored at step 510, processor 24 may be programmed to select 3 initial channel numbers. Table 1 below shows the total number of channel numbers stored at step 510 versus the number of initial channel numbers that may be selected by processor 24 at step 520 according to an exemplary embodiment of the present invention.

TABLE 1

| Total Number of Stored Channel Numbers | Number of Initial Channel Numbers Selected |
|---|---|
| less than 5 | 0 |
| 5 to 9 | 1 |
| 10 to 14 | 2 |
| 15 to 19 | 3 |
| 20 to 24 | 4 |
| 25 to 29 | 5 |
| 30 to 39 | 6 |
| 40 to 49 | 7 |
| 50 or more | 8 |

As indicated in Table 1 above, the number of initial channel numbers increases as the total number of stored channel numbers increases. According to an exemplary embodiment, processor 24 is programmed to select initial channel numbers at step 520 so that the number of stored (i.e., tunable) channels numbers in a group between each initial channel number is approximately the same. That is, the initial channel numbers may be automatically selected by processor 24 such that consecutive initial channel numbers are approximately the same distance away from one another. If there is only one initial channel number, it is the median channel number among the plurality of stored (i.e., tunable) channel numbers in the group.

Accordingly, referring back to the example where there are a total of 18 channel numbers (i.e., channels 1 to 18) in the group stored at step 510, processor 24 may automatically select channel numbers 1, 7 and 13 as the 3 initial channel numbers at step 520. If, however, the one or more initial channel numbers automatically selected by processor 24 at step 520 are not channels that the user typically listens to and/or views, the user may choose to adjust the initial channel numbers (e.g., by interacting with an on-screen menu display) according to his or her preference.

At step 525, one of the initial channel numbers is selected and displayed. Illustratively, the initially selected initial channel number is the median initial channel number among the initial channels.

At step 530, the user may use control key 15 of user input device 10 for channel selection. According to an exemplary embodiment, the user may navigate from one initial channel number to another initial channel number by pressing control key 15, and may navigate those channel numbers located between the initial channel numbers by rotating control key 15. As an example, assume that the user has previously selected 3 initial channel numbers at step 520, namely channel numbers 5, 13 and 25, which he or she frequently listen to and/or view. Further assume that electronic apparatus 20 is currently tuned to initial channel number 13 as represented by exemplary on-screen menu display 600 shown in FIG. 6. While tuned to initial channel number 13, if the user presses control key 15 in the upward direction (i.e., TAB+ in FIG. 6), then processor 24 will cause the next higher initial channel number, namely initial channel number 25, to be displayed as represented by exemplary on-screen menu display 700 shown in FIG. 7.

Figure 8:
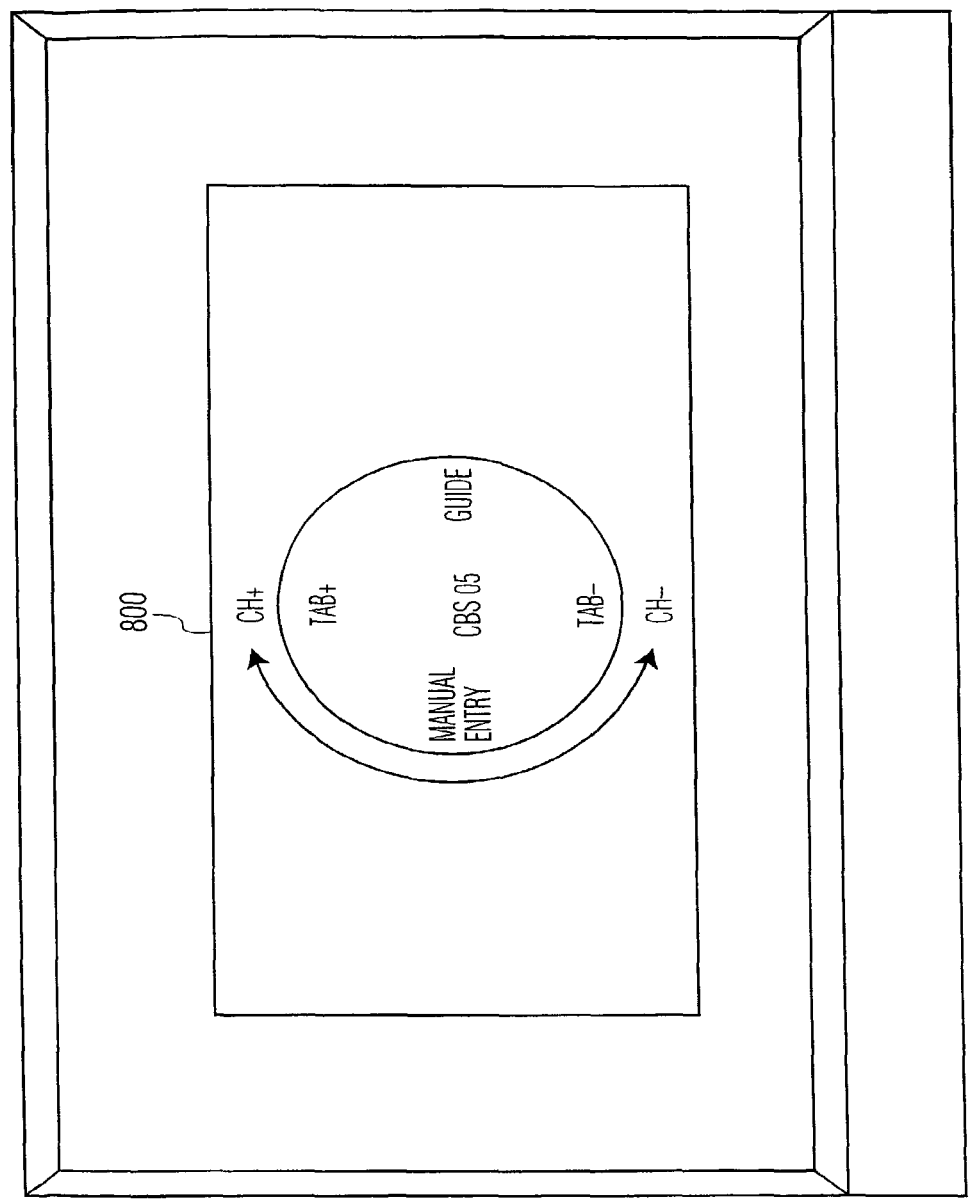
FIG. 8 is yet another on-screen menu display according to an exemplary embodiment of the present invention.

Conversely, while tuned to initial channel number 13, if the user presses control key 15 in the downward direction (i.e., TAB− in FIG. 6), then processor 24 will cause the next lower initial channel number, namely initial channel number 5, to be displayed as represented by exemplary on-screen menu display 800 shown in FIG. 8. In the aforementioned manner, the user may navigate among the respective initial channel numbers by pressing control key 15 in the upward and/or downward direction(s). To tune to one of the initial channel numbers, the user may press control key 15 in a predetermined direction (e.g., center direction, etc.) while that initial channel number is being displayed.

To navigate those channel numbers located between initial channel numbers, the user may rotate control key 15. For example, assume that electronic apparatus 20 is currently tuned to initial channel number 13 as represented by exemplary on-screen menu display 600 shown in FIG. 6. While tuned to initial channel number 13, if the user rotates control key 15 in the clockwise direction (i.e., CH+ in FIG. 6) by one increment, then processor 24 will cause the next higher channel number, namely channel number 14, to be displayed (not represented in FIGS.). If the user continues to rotate control key 15 in the clockwise direction, then processor 24 will cause the next higher channel numbers (i.e., 15, 16, 17, etc.) to be sequentially displayed (not represented in FIGS.) as control key 15 is rotated.

Conversely, while tuned to initial channel number 13, if the user rotates control key 15 in the counter-clockwise direction (i.e., CH− in FIG. 6) by one increment, then processor 24 will cause the next lower channel number, namely channel number 12, to be displayed (not represented in FIGS.). If the is user continues to rotate control key 15 in the counter-clockwise direction, then processor 24 will cause the next lower channel numbers (i.e., 11, 10, 9, etc.) to be sequentially displayed (not represented in FIGS.) as control key 15 is rotated. In the aforementioned manner, the user may navigate among the channel numbers located between initial channel numbers by rotating control key 15 in the clockwise and/or counter-clockwise direction(s). The user may also, of course, rotate control key 15 to navigate past the initial channel numbers in both directions. To tune to a particular channel number, the user may press control key 15 in a predetermined direction (e.g., center direction, etc.) while that channel number is being displayed.

Figure 6:
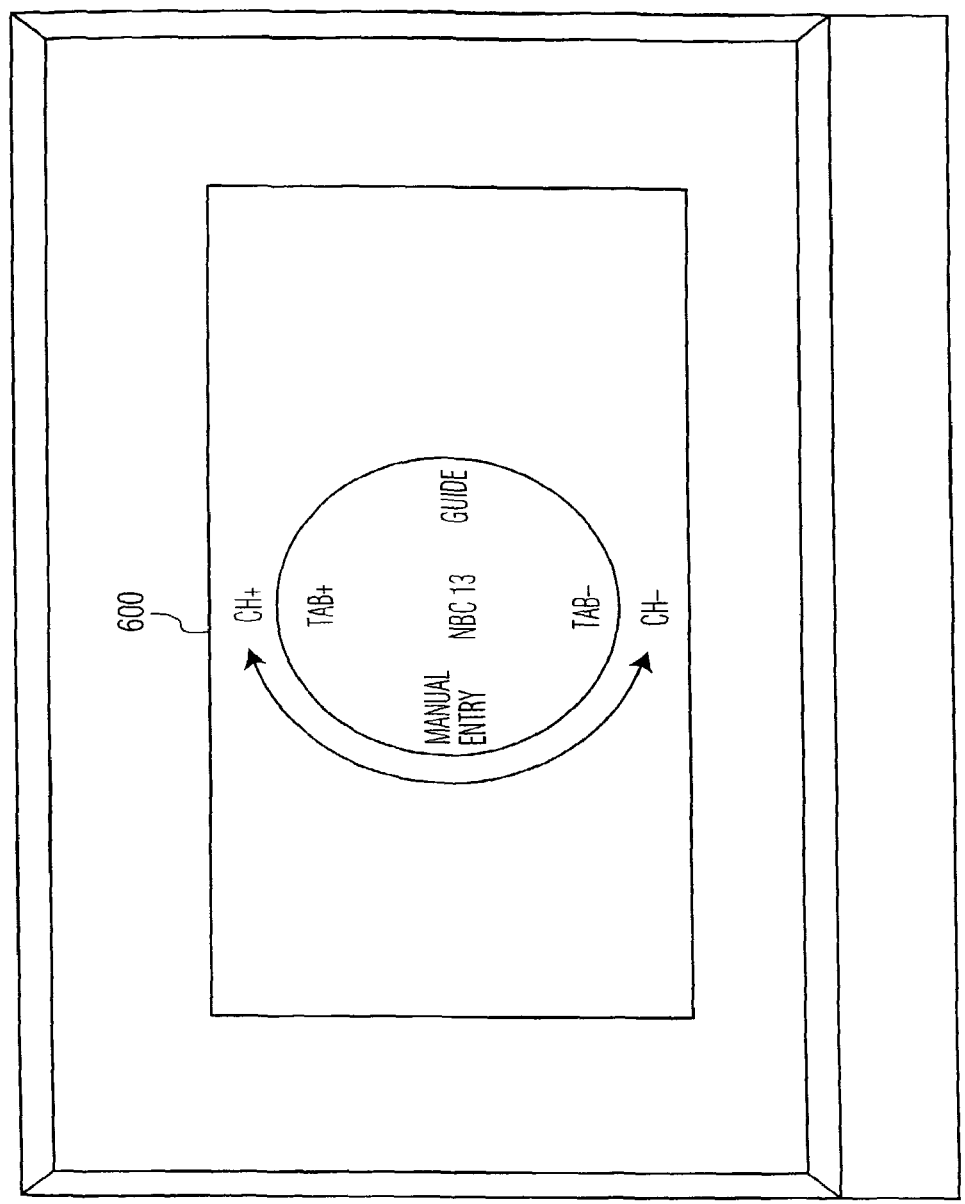
FIG. 6 is an on-screen menu display according to an exemplary embodiment of the present invention.
Figure 7:
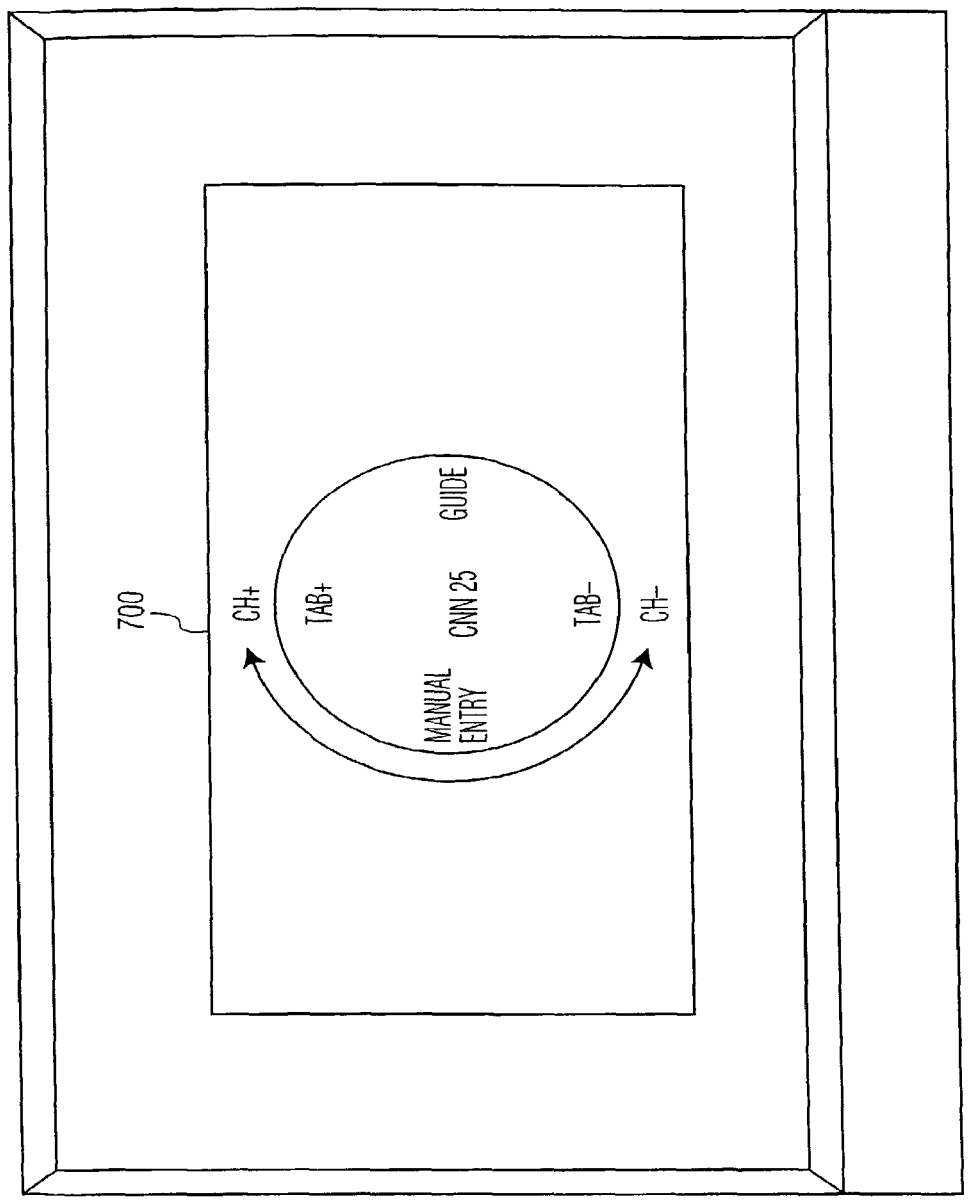
FIG. 7 is another on-screen menu display according to an exemplary embodiment of the present invention.

As indicated in FIGS. 6 to 8, the user may also use control key 15 to access an electronic program guide (EPG) feature and a manual channel entry feature of electronic apparatus 20. According to an exemplary embodiment, pressing control key 15 in the right direction enables access to the EPG feature which provides a listing of programs available for listening and/or viewing. Also according to an exemplary embodiment, pressing control key 15 in the left direction enables access to the manual channel entry feature which allows users to directly enter a desired channel number. Further details regarding the manual channel entry feature will be provided later herein.

At step 540, the user may elect to change one or more initial channel numbers. If the user elects not to change any initial channel numbers at step 540, process flow loops back to step 530 where the user may continue to use control key 15 of user input device 10 for channel selection with the currently established initial channel numbers, as previously described above. Alternatively, if the user elects to change one or more initial channel numbers at step 540, process flow loops back to step 520 where the user may select one or more new initial channel numbers.

Figure 9:
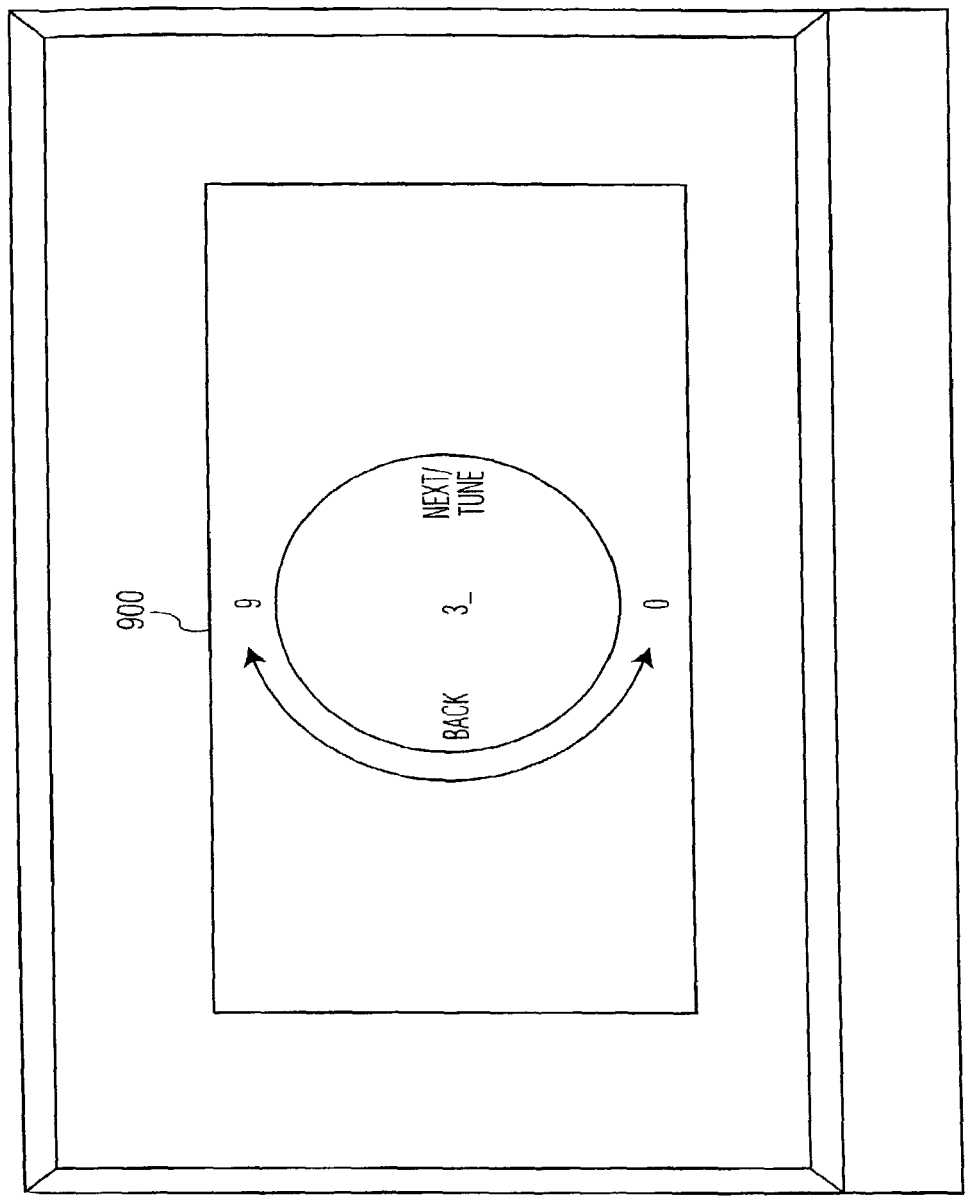
FIG. 9 is still yet another on-screen menu display according to an exemplary embodiment of the present invention.

According to another exemplary embodiment, control key 15 of user input device 10 may also be used for the manual channel entry feature of electronic apparatus 20. As previously indicated herein, the user may press control key 15 in the left direction (see FIGS. 6 to 8) to access the manual channel entry feature which allows the user to directly enter a desired channel number. Upon accessing the manual channel entry feature, the user may be presented with an on-screen menu display such as on-screen menu display 900 shown in FIG. 9. As indicated in FIG. 9, the user may rotate control key 15 in the clockwise direction to increment a displayed digit, and rotate control key 15 in the counter-clockwise direction to decrement a displayed digit. Pressing control key 15 in one or more predetermined directions would allow the user to enter additional digits, or to tune to the currently displayed channel number. For example, a user may press the control key in the left direction to enter the next digit and in the center direction to tune to the currently displayed channel number.

As described herein, the present invention provides a method for enabling users to select channels for an electronic apparatus such as a television signal receiver in an easy and convenient manner via a user input device having a key capable of being rotated and pressed. The present invention may be applicable to various apparatuses, either with or without an integrated display device. Accordingly, the phrase "television signal receiver" as used herein may refer to systems or apparatuses having a plurality of input channels, including, but not limited to, television sets, computers or monitors that include an integrated display device, and systems or apparatuses such as set-top boxes, video cassette recorders (VCRs), digital versatile disk (DVD) players, video game boxes, personal video recorders (PVRs), computers or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for enabling channel selection for an electronic apparatus via a user input device having a key capable of being rotated and pressed, said method comprising:
enabling selection of at least four channel numbers to form a first group;
enabling selection of a first one of said channel numbers as a first initial channel number in response to said selection of said channel numbers in the first group;
enabling display of said first initial channel number;
enabling display of a second one of said channel numbers that is larger than said first initial channel number if said key is rotated in a first direction;
enabling display of a third one of said channel numbers that is smaller than said first initial channel number if said key is rotated in a second direction, wherein only one of said initial channel number, said second channel number and said third channel number is displayed at a time;
enabling selection of a fourth one of said channel numbers as a second initial channel number, wherein one of said second channel number and said third channel number is located between said first initial channel number and said second initial channel number, wherein at least two initial channel numbers are automatically selected by said electronic apparatus during a setup process so that the number of channel numbers between said initial channel numbers is approximately the same, and thereafter may each be adjusted upwardly and downwardly by a user; and
tuning to the displayed one of said first initial channel number, said second channel number and said third channel number responsive to depression of said key, wherein after said first initial channel number is tuned to in said tuning step, switching from said first initial channel number to said second initial channel number responsive to further depression of said key.

2. The method of claim 1, further comprising the step of storing said plurality of channel numbers.

3. The method of claim 1, further comprising the steps of:
enabling selection of a plurality of channel numbers to form a second group; and
enabling selection of one of said first and second groups, wherein said first initial channel number selection enabling step comprises the step of enabling selection of a first one of said channel numbers in a selected group as the first initial channel number.

4. The method of claim 1, wherein after any of said initial channel numbers is tuned, switching from said tuned initial channel number to another of said initial channel numbers responsive to further depression of said key.

5. An electronic apparatus for enabling channel selection via a user input device having a key capable of being rotated and pressed, said electronic apparatus comprising:
a processor for enabling selection of at least four channel numbers to form a group;

a memory coupled to said processor for storing said channel numbers in the group;

said processor enabling selection of a first one of said channel numbers as a first initial channel number in response to said selection of channel numbers in said group, and enabling display of said first initial channel number;

said processor enabling display of a second one of said channel numbers that is larger than said first initial channel number if said key is rotated in a first direction, and enabling display of a third one of said channel numbers that is smaller than said first initial channel number if said key is rotated in a second direction, wherein only one of said initial channel number, said second channel number and said third channel number is displayed at a time; and said processor enabling selection of a fourth one of said channel numbers as a second initial channel number, wherein one of said second channel number and said third channel number is located between said first initial channel number and said second initial channel number, wherein at least two initial channel numbers are automatically selected by said processor so that the number of channel numbers between said initial channel numbers is approximately the same, and thereafter may each be adjusted upwardly and downwardly by a user, wherein said electronic apparatus tunes to the displayed one of said first initial channel number, said second channel number and said third channel number responsive to depression of said key, wherein after said first initial channel number is tuned, said processor causes said electronic apparatus to switch from said first initial channel number to said second initial channel number responsive to further depression of said key.

6. The electronic apparatus of claim 5, wherein said processor adjusts said first initial channel number upwardly and downwardly according to user inputs.

7. The electronic apparatus of claim 5, wherein after any of said initial channel numbers is tuned, said processor causes said electronic apparatus to switch from said tuned initial channel number to another of said initial channel numbers responsive to further depression of said key.

8. A television signal receiver for enabling channel selection via a user input device having a key capable of being rotated and pressed, said television signal receiver comprising:

a processor for enabling selection of at least four channel numbers to form a group;

a memory coupled to said processor for storing said channel numbers in said group;

said processor enabling selection of a first one of said channel numbers as a first initial channel number in response to said selection of channel numbers in the group, and enabling display of said first initial channel number;

said processor enabling display of a second one of said channel numbers that is larger than said first initial channel number if said key is rotated in a first direction, and enabling display of a third one of said channel numbers that is smaller than said first initial channel number if said key is rotated in a second direction, wherein only one of said initial channel number, said second channel number and said third channel number is displayed at a time; and said processor enabling selection of a fourth one of said channel numbers as a second initial channel number, wherein one of said second channel number and said third channel number is located between said first initial channel number and said second initial channel number, wherein at least two initial channel numbers are automatically selected by said processor so that the number of channel numbers between said initial channel numbers is approximately the same, and thereafter may each be adjusted upwardly and downwardly by a user, wherein said television signal receiver tunes to the displayed one of said first initial channel number, said second channel number and said third channel number responsive to depression of said key, wherein after said first initial channel number is tuned, said processor causes said television signal receiver to switch from said first initial channel number to said second initial channel number responsive to further depression of said key.

9. The television signal receiver of claim 8, wherein said processor adjusts said first initial channel number upwardly and downwardly according to user inputs.

10. The television signal receiver of claim 8, wherein after any of said initial channel numbers is tuned, said processor causes said television signal receiver to switch from said tuned initial channel number to another of said initial channel numbers responsive to further depression of said key.

\* \* \* \* \*